US011418507B2

(12) United States Patent
Douglas et al.

(10) Patent No.: US 11,418,507 B2
(45) Date of Patent: *Aug. 16, 2022

(54) METHOD AND SYSTEM FOR AUTHENTICATION VIA LOCATION MONITORING

(71) Applicant: Capital One Services, LLC, McLean, VA (US)

(72) Inventors: Hutch Douglas, McLean, VA (US); Keith Hamburg, Reston, VA (US); Ya Liu, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 167 days.

This patent is subject to a terminal disclaimer.

(21) Appl. No.: 16/913,609

(22) Filed: Jun. 26, 2020

(65) Prior Publication Data

US 2020/0329046 A1 Oct. 15, 2020

Related U.S. Application Data

(63) Continuation of application No. 16/427,168, filed on May 30, 2019, now Pat. No. 10,735,421, which is a continuation of application No. 16/249,773, filed on Jan. 16, 2019, now Pat. No. 10,389,715.

(51) Int. Cl.
*H04L 29/06* (2006.01)
*H04L 9/40* (2022.01)
*G06Q 40/02* (2012.01)

(52) U.S. Cl.
CPC ........ *H04L 63/0884* (2013.01); *G06Q 40/02* (2013.01); *H04L 63/105* (2013.01); *H04L 63/107* (2013.01)

(58) Field of Classification Search
None
See application file for complete search history.

(56) References Cited

U.S. PATENT DOCUMENTS

| 8,495,714 | B2 * | 7/2013 | Jones | H04W 12/06 709/225 |
| 8,661,008 | B2 * | 2/2014 | Bennett | G06F 16/9535 707/821 |
| 10,117,096 | B2 * | 10/2018 | De Lorenzo | H04W 12/04 |
| 2005/0212654 | A1 | 9/2005 | Yoda | |
| 2013/0024915 | A1 * | 1/2013 | Jones | H04L 63/083 726/5 |
| 2018/0317054 | A1 | 11/2018 | Singh | |

(Continued)

*Primary Examiner* — William J. Goodchild
(74) *Attorney, Agent, or Firm* — Greenberg Traurig, LLP

(57) ABSTRACT

A computer-implemented method is provided to authenticate a user. The computer-implemented method includes obtaining, at an authentication server, a current location and an associated time from a client device of the user over a communications network; determining, by a hardware processor, a location score based on a correlation between the current location and the associated time and a historical location and a historical time that are associated with the client device of the user; determining, by the hardware processor, a risk assessment score based on the location score; and providing, over the communications network, an authentication verification for the user to perform one or more actions with an online resource based on the risk assessment score.

20 Claims, 5 Drawing Sheets

(56) References Cited

U.S. PATENT DOCUMENTS

| | | |
|---|---|---|
| 2018/0336541 A1 | 11/2018 | Tavares |
| 2018/0336565 A1 | 11/2018 | Birukov |
| 2018/0341013 A1 | 11/2018 | Cristache |
| 2018/0349912 A1 | 12/2018 | Fiterman |
| 2018/0365676 A1 | 12/2018 | Studnicka |
| 2018/0374152 A1 | 12/2018 | Dominguez |
| 2019/0014097 A1 | 1/2019 | Hwang |
| 2019/0014142 A1 | 1/2019 | Madhu |

* cited by examiner

300

302
Obtaining, at an authentication server, a current location and an associated time from a client device of the user over a communications network

304
Determining, by a hardware processor of the authentication server, that the current location and the associated time is at or near a historical location and a historical time associated with the user

306
Determining, by the hardware processor, a location score based on a degree of correlation between the current location and the associated time and the historical location and the historical time

308
Determining, by the hardware processor, a risk assessment score based on the location score

310
Providing, over the communications network, an authentication verification for the user to perform one or more actions with an online resource based on the risk assessment score

FIG. 3

METHOD AND SYSTEM FOR AUTHENTICATION VIA LOCATION MONITORING

CROSS-REFERENCE TO RELATED APPLICATIONS

This application is a continuation of U.S. patent application Ser. No. 16/249,773, (now allowed), which was filed on Jan. 16, 2019, the entirety of which is incorporated by reference.

FIELD

The present disclosure relates to authenticating a user, and more particularly, to authenticating a user with an online resource based on location information.

BACKGROUND

Traditionally, authentication for certain online resources, such as financial or government services or accounts, is performed using single factor or multi-factor authentication. Single factor authentication uses a single credential for authentication. Typically, the single credential is a password. Improvements have been made to the strength of the password that is used by including additional types and numbers of characters; however, these improvements do not change the fact that the password is still a single piece of authenticating information. Multi-factor authentication extends the single factor authentication by adding one or more additional authenticating credentials to the single credential. These one or more additional authenticating credentials can include information related to the user themselves, such as biometric information, and special security information that the user possesses, such as a token or a one-time password. Even with conventional multi-factor authentication, however, online resources are still vulnerable to exploitation by a determined attacker or entity.

Therefore, a need exists for improved authentication systems and methods. To that end, the subject disclosure addresses and reduces the vulnerabilities of existing authentication techniques by using additional credentials that include information related to a user's past movement behavior.

BRIEF SUMMARY OF THE INVENTION

Generally speaking, the present disclosure describes devices, computer-implemented methods, systems, and non-transitory computer readable medium that authenticate a user by monitoring a user's travels over time and using that information in combination with the user's location when being authenticated to determine a risk score and/or an access level for the user that may be used, for example, to access an online resource that the user wishes to utilize.

In accordance with examples of the present disclosure, a computer-implemented method to authenticate a user, is provided. The computer-implemented method comprises obtaining, at an authentication server, a current location and an associated time from a client device of the user over a communications network; determining, by a hardware processor, a location score based on a correlation between the current location and the associated time and a historical location and a historical time that are associated with the client device of the user; determining, by the hardware processor, a risk assessment score based on the location score; and providing, over the communications network, an authentication verification for the user to perform one or more actions with an online resource based on the risk assessment score.

Various examples of the present disclosure can include the following features. The computer-implemented method can further include obtaining, at the authentication server, a plurality of locations and an associated plurality of times from the client device over the communications network; and storing, by the authentication server, the plurality of locations and the associated plurality of times in a history location record of a database that is associated with an account of the user of the client device. The computer-implemented method can further comprise obtaining authorization from the user to collect location information of the user. The determining the location score can be based on the correlation that comprises accessing the history location record; filtering out entries in the history location record associated with predetermined filtering criteria; comparing, by the hardware processor, the plurality of locations from the history location record that is filtered with the current location at approximately a same time of day as the associated time for the current location; determining, by the hardware processor, that the current location is within a predetermined distance from the historical location at approximately the same time of day; and assigning the location score based the predetermined distance. The predetermined distance can be less than or equal to one mile from the historical location. The comparing can comprise selecting a predetermine time frame from the historic location record with which to perform the comparing. The predetermined time frame can be a prior day, a prior week, or a prior month. The predetermined filtering criteria can comprise holidays and weekends. An action of the one or more actions can comprise one or more of: viewing a financial account, performing a transaction in the financial account, and communicating with an authorized person managing the financial account. The availability of the action among the one or more actions with the online resource is dependent on the risk assessment score, wherein a lower risk assessment score permits more actions with the online resource.

In accordance with examples of the present disclosure, an authentication system for authenticating a user is provided. The authentication system comprises one or more hardware processors; and a memory coupled to the one or more hardware processors, the memory storing instructions, which when executed by the one or more hardware processors, cause the one or more hardware processors to perform operations comprising: determining a location score based on a correlation between a current location of the user and an associated time and a historical location and a historical time for the user; determining a risk assessment score based on the location score; and providing, over a communications network, an authentication verification for the user to perform one or more actions with an online resource based on the risk assessment score.

Various examples of the present disclosure can include the following features. The operations further comprise: obtaining a plurality of locations and an associated plurality of times from a client device of the user over the communications network; and storing the plurality of locations and the associated plurality of times in a history location record of a database that is associated with an account of the user of the client device. The authentication system further comprises obtaining authorization from the user to collect location information of the user. The determining the location score based on the correlation comprises: accessing the history location record; filtering out entries in the history location record associated with predetermined filtering criteria; comparing the plurality of locations from the history location record that is filtered with the current location at approximately a same time of day as the associated time for the current location; determining that the current location is within a predetermined distance from the historical location at approximately the same time of day; and assigning the location score based the predetermined distance. The predetermined distance can be less than or equal to one mile from the historical location. The comparing can comprise selecting a predetermine time frame from the historic location record with which to perform the comparing.

In accordance with examples of the present disclosure, a non-transitory computer-readable medium for performing an authentication method for authenticating a user is provided. The non-transitory computer-readable medium comprising instructions, which when executed by one or more hardware processors, cause the one or more hardware processors to perform operations comprising: obtaining a plurality of locations and an associated plurality of times from a client device of the user; determining a location score based on a correlation between a current location of the user and an associated time and a historical location and a historical time based on the plurality of locations and associated plurality of time that are obtained for a user; determining a risk assessment score based on the location score; and providing an authentication verification for the user to perform one or more actions with an online resource based on the risk assessment score.

Various examples of the present disclosure can include the following features. The non-transitory computer-readable medium further comprises storing the plurality of locations and the associated plurality of times in a history location record of a database that is associated with an account of the user of the client device. An action of the one or more actions comprises one or more of: viewing a financial account, performing a transaction in the financial account, and communicating with an authorized person managing the financial account. The availability of the action among the one or more actions with the online resource is dependent on the risk assessment score, wherein a lower risk assessment score permits more actions with the online resource.

In accordance with examples of the present disclosure, a computer-implemented method to authenticate a user is provided. The computer-implemented method comprises obtaining, at an authentication server, a current location and an associated time from a client device of the user over a communications network; determining, by a hardware processor of the authentication server, that the current location and the associated time is at or near a historical location and a historical time associated with the user; determining, by the hardware processor, a location score based on a degree of correlation between the current location and the associated time and the historical location and the historical time; determining, by the hardware processor, a risk assessment score based on the location score; and providing, over the communications network, an authentication verification for the user to perform one or more actions with an online resource based on the risk assessment score.

In accordance with examples of the present disclosure, an authentication system for authenticating a user is provided. The authentication system comprises one or more processors; and a memory coupled to the one or more processors, the memory storing instructions, which when executed by the one or more processors, cause the one or more processors to perform operations comprising: comparing a current location and an associated time with a historical location and a historical time associated with the user; determining, by the hardware processor, a location score based on a degree of correlation between the current location and the associated time and the historical location and the historical time; determining, by the hardware processor, a risk assessment score based on the location score; and providing, over the communications network, an authentication verification for the user to perform one or more actions with an online resource based on the risk assessment score.

In accordance with examples of the present disclosure, an authentication system for authenticating a user is provided. The authentication system comprises one or more processors; and a memory coupled to the one or more processors, the memory storing instructions, which when executed by the one or more processors, cause the one or more processors to perform operations comprising: retrieving a history location record for the user; comparing a plurality of locations from the history location record with a current location at approximately a same time of day; determining that the current location is within a predetermined distance from a historical location at approximately the same time of day; assigning the location score based the predetermined distance; determining a risk assessment score based on the location score; and providing an authentication verification for the user to perform one or more actions with an online resource based on the risk assessment score.

Various examples of the present disclosure can include the following features. The computer-implemented method can further comprise obtaining, at the authentication server, a plurality of locations and an associated plurality of times from the client device over the communications network; and storing, by the authentication server, the plurality of locations and the associated plurality of times in a history location record of a database that is associated with an account of the user of the client device. The computer-implemented method can further comprise obtaining authorization from the user to collect location information of the user. The determining the location score can be based on the degree of correlation that comprises retrieving the history location record; filtering out entries in the history location record associated with predetermined filtering criteria; comparing, by the hardware processor, the plurality of locations from the history location record that is filtered with the current location at approximately a same time of day as the associated time for the current location; determining, by the hardware processor, that the current location is within a predetermined distance from the historical location at approximately the same time of day; and assigning the location score based the predetermined distance. The predetermined distance can be not more than 1 mile from the historical location. The comparing can comprise selecting a predetermine time frame from the historic location record with which to perform the comparing. The predetermined time frame can be a prior day, a prior week, or a prior month. The predetermined filtering criteria can comprise holidays and weekends. The action can comprises at least one of: viewing a financial account, performing a transaction in the financial account, and communicating with an authorized person managing the financial account. The availability of an action can include among the one or more actions with the online resource that is dependent on the risk assessment score, wherein a lower risk assessment score permits more actions with the online resource.

BRIEF DESCRIPTION OF THE FIGURES

The accompanying drawings, which are incorporated into and constitute a part of this specification, illustrate implementations of the disclosure and together with the description, serve to explain the principles of the disclosure.

FIG. 3 is a process flow diagram illustrating an example of a process for authenticating via location monitoring, according to examples of present disclosure.

DETAILED DESCRIPTION

Figure 1:
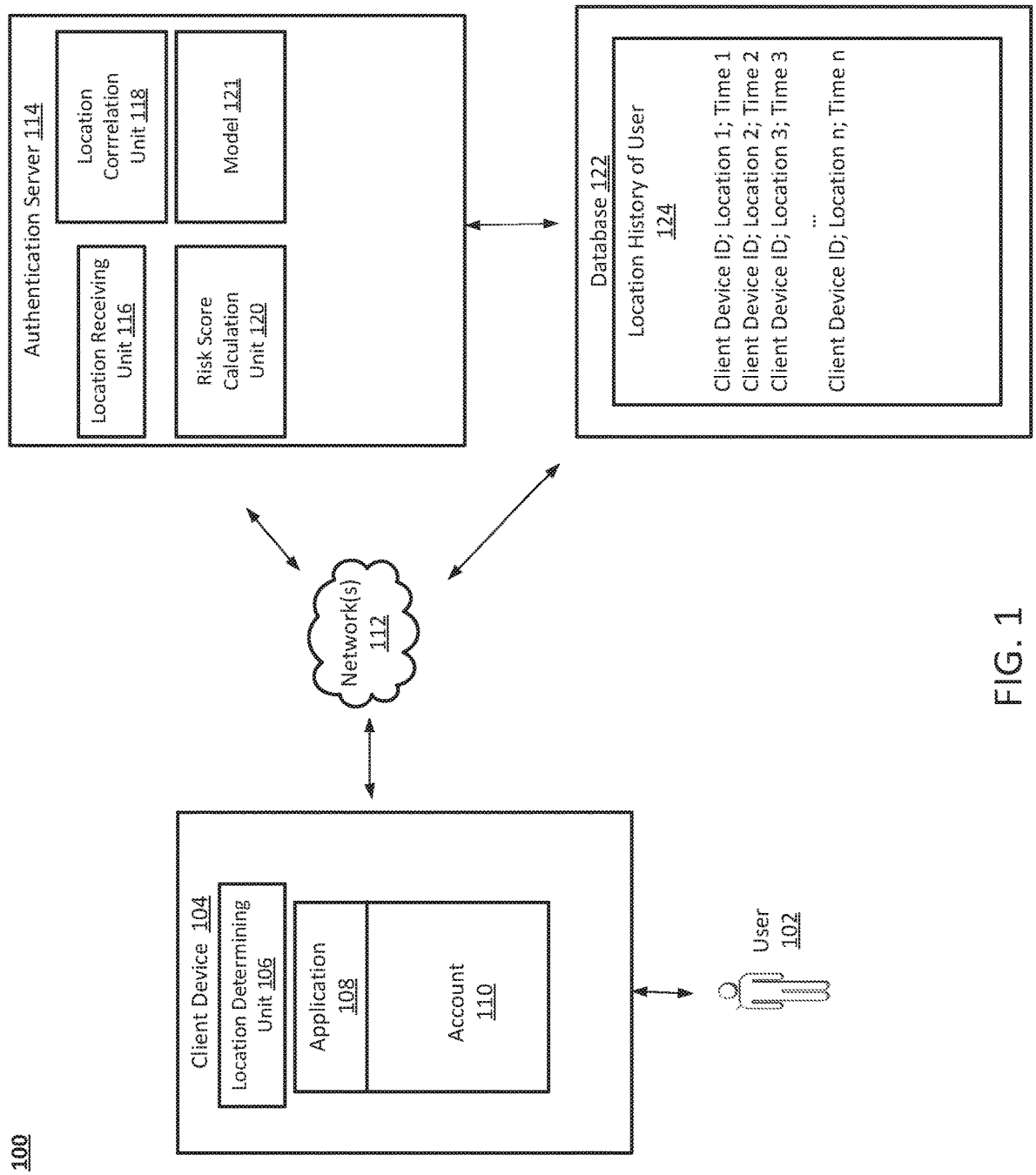
FIG. 1 is a block diagram illustrating an example of an operating environment for authenticating a user according to one or more implementations of the disclosure.

Various implementations and aspects of the disclosures will be described with reference to details discussed below, and the accompanying drawings will illustrate the various implementations. The following description and drawings are illustrative of the disclosure and are not to be construed as limiting the disclosure. Numerous specific details are described to provide a thorough understanding of various implementations of the present disclosure. However, in certain instances, well-known or conventional details are not described in order to provide a concise discussion of implementations of the present disclosure.

Reference in the specification to "one implementation" or "an implementation" or "some implementations," means that a particular feature, structure, or characteristic described in conjunction with the implementation can be included in at least one implementation of the disclosure. The appearances of the phrase "implementation" in various places in the specification do not necessarily all refer to the same implementation.

The terms "about" and "approximately," when used to modify or describe a value (or range of values), mean reasonably close to that value or range of values. Thus, the embodiments described herein are not limited to only the recited values and ranges of values, but rather should include reasonable workable deviations.

The term "unit" refers to physical electronic components (e.g., hardware) and any software and/or firmware ("code") which may configure the hardware, be executed by the hardware, and or otherwise be associated with the hardware.

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The present disclosure is generally related to authenticating information, and, more specifically, to methods, apparatuses, and computer program products for authenticating a user. Implementations of the methods, apparatuses, and computer program products disclosed herein provide for obtaining, at an authentication server, a current location and an associated time from a client device of the user over a communications network. The present disclosure further describes determining, e.g., using a hardware processor of the authentication server, that the current location and its associated time is at or near or otherwise corresponds to a historical location(s) and a historical time(s) associated with the user. Various implementations described herein can calculate or determine, e.g., using the hardware processor, a location score based on the degree of correlation between the current location and the associated time and the historical location(s) and the historical time(s). Various implementations described herein can also calculate or determine, e.g., using the hardware processor, a risk assessment score based on the location score and in some implementations, on other factors. Various implementations may also provide, e.g., over the communications network, an authentication verification for the user, which may enable the user to perform one or more actions with an online resource, where the enabled actions may be based on the risk assessment score.

As such, implementations consistent with the present disclosure provide a particular, technically advantageous computer architecture that improves security for user transactions, including, for example, financial transactions such as establishing bank accounts, fund withdrawals, and fund transfers. In certain implementations, an authentication server or system may be used for monitoring the current location of user, e.g., an existing customer of a financial entity (e.g., a bank customer), determining whether the current location of the user is consistent with past locations of the user, and calculating or determining a risk score for the user, which may be a function of the consistency between the user's current location and one or more of the user's past locations, optionally at approximately the same time of day, in order to permit the user to perform an action and/or access a resource, for example, permit a customer to perform a transaction with the financial entity. As such, implementations consistent with the present disclosure provide a particular, technically advantageous system to reduce the instance of fraud associated with user actions (e.g., financial transactions) and improve security when verifying a user because a fraudulent actor impersonating the user is very unlikely to know, or to coincidentally be at, a location that the legitimate user frequents, especially at the same time of day. Moreover, a legitimate user's movement patterns and location history are very difficult for a fraudulent actor to discover, other than by physically following the user for several days, which makes location information a very secure authentication credential compared to conventional credentials such as passwords.

Various implementations consistent with the present disclosure leverage the wide-spread use of mobile personal communication devices (e.g., smart phones) that have location finding or tracking abilities (e.g., GPS and/or multilateration between cell towers) to facilitate identity verification of users. For example, a financial entity, a government agency, or a third party may provide a downloadable software application to the user to install on their mobile communication device, where the software application is designed to collect location information of the user to provide a proof-of-identity in the form of location records that are used, for example, to generate a risk score.

FIG. 1 is a block diagram illustrating an example of an operating environment for authenticating a user according to one or more implementations of the disclosure. As shown, the operating environment 100 may include one or more systems including a client device 104, an authentication server 114, a database 122 that stores previously collected user location information, and a network 112 that communicatively connects the client device 104, authentication server 114, and database 122, such that they can interact with each other. In various implementations, the environment 122 may include various other systems (not shown) such as banking/financial systems, which may interact via the network 112. The network 112 may be any type of wired or wireless network including a local area network (LAN), a wide area network (WAN), or a direct communication link, or other suitable connection.

The client device 104 may include an application 108 (or application software) which may include program code (or a set of instructions) that performs various operations (or methods, functions, processes, etc.) as further described herein. For example, the application 108 may be or include any type of "app" such as a financial application, account enrollment application, government service application, etc. In some implementations, the application 108 enables a user 102 to access or sign up and apply for financial products and services such as bank accounts, loans, credit cards, mortgages, retirement savings accounts, brokerage accounts, mobile and online payment services (e.g., the Venmo™ and PayPal™ services from PayPal Holdings, Inc. of San Jose, Calif.), and other financial services and the like. In other implementations, the application 108 enables users to access or enroll in government services such as school enrollment, voter registration, online voting, absentee voting, registering for computer based trainings or tests (such as certification exams), a national health insurance program (e.g., Medicare), social security benefits, unemployment compensation, federal student loans, the National Flood Insurance Program (NFIP), Supplemental Nutrition Assistance Program (SNAP) benefits, and the like.

In certain implementations, the application 108 may be an application usable to manage an existing account 110 of an account holder or customer (e.g., the user 102). For example, the application 108 may be usable to perform online transactions for a bank account, a brokerage account, a health savings account (HSA), a pension account, or a retirement savings account (e.g., a 401(k) or individual retirement account (IRA)). According to such implementations, the application 108 may require the account holder (e.g., the user 102) to provide or allow access to current location information, which the application uses to verify proof-of-identity based on a user's risk score, which may be calculated by comparing current locations visited with past locations visited. In some implementations, the application 108 may request the current location information in response to the account holder 102 initiating or requesting any transaction that is classified as requiring proof of identity or identity authentication, such as a high-risk or unusual transaction. Such further proof-of-identity information may be required even though the user 102 is already logged into the account 110 using an account ID and password or other conventional multifactor identification.

The application 108 communicates with a location determining unit 106, e.g., a global positioning receiver, of the client device 104 to obtain location information (e.g., GPS coordinates such as latitude and longitude, or the like) and provides the location information to the authentication server 114. The authentication server 114 communicates with the database 122 to store and retrieve location information associated with the user 102. For example, in various implementations, the database 122 comprises a location history 124 of a user 102, and the history 124 contains a set of several records. For example, the location history 124 may include a set of records or rows that each store an identifier of the client device 104, a sample or snapshot of the client device 104's location (e.g., GPS coordinates specifying the user 102's location), and a time, (which may include a date, day of the week, and an hour and minute), at which the location snapshot was recorded. The authentication server 114 can obtain location information, which may including data such as the client device identifier, the location datum, and the associated time datum, from the client device 104, and the authentication server 114 may provide this information to the database 122 to be stored in the location history 124 as a new record.

The authentication server 114 can comprise a location receiving unit 116, a location correlation unit 118, and a risk score calculation unit 120. In operation, the location receiving unit 116 of the authentication server 114 receives location information from the client device 104 over time (e.g., periodically, such as every 2 minutes, or every 3 minutes, or every 5 minutes, or every 7 minutes; or whenever triggered by a specified event, such as when the user 102 uses the application 108; etc.) and stores this information in the database 122, for example, in a manner that is indexed or searchable using the ID of the client device 104, which corresponds to the user 102 of the client device 104.

In various implementations, when the authentication server 114 authenticates the user 102, such as when requested by the application 108, the authentication server 114 issues a command to the client device 104 to send the current location of the user 102 to the location receiving unit 116. The location receiving unit 116 also issues a command to the database 122 to obtain information about the past location history 125 for the user 102 (i.e., for the device 104). The location correlation unit 118 receives the location information (e.g., the current location and at least part of the location history 124) from the location receiving unit 116 (or directly from the database 122) and calculates or determines how close the current location is to (i.e., the distance from) the historical location(s) from the location history 124 at the same or about the same time of day and/or day of the week. As noted, the location information includes time information (e.g., a timestamp), and in some implementations, the location correlation unit 118 may also calculate or determine how close or near in time the timestamp of the current location is to the timestamp(s) of the same or nearby historical location(s). Various embodiments of the location correlation unit 118 employ an algorithm that calculates a degree of correlation between the current location and the historical location(s) based on the distance between locations, such that the degree of correlation is a function of the difference in distance between the current location of the user 102 and the historic location(s) of the user 102. For example, if the distance difference is small, then the degree of correlation is high. In some embodiments, the degree of correlation may also be a function of the difference in time between the timestamp of the current location and the timestamp(s) of the same or nearby historical location(s). For example, if the time difference is small, then the degree of correlation may be raised higher. The location correlation unit 118 may then create a location correlation score based on the degree of correlation and supply it to the risk score calculation unit 120.

The risk score calculation unit 120 receives the location correlation score and uses it to determine a risk assessment score for the user 102. The risk assessment score is a measure of how confident the model determines that the person is who he/she claims to be. For example, the location correlation score will be high if the location detected for the user 102 is his frequently visited places, which may be an indicators for low overall confidence level to say that the person seems to be who he/she claims to be. Hence, a grant of authentication can be make. Additionally, other decision factors may be used in deciding the grant of authentication. On the other hand, if the location detected when the person is asking for an authentication is far away (for example, current location is Italy when the location detected previously is Washington D.C.) from a previously determined location, the location correlation score will be low. Hence, the risk level/score can be high and that person should likely not be authenticated. Various embodiments of the risk score calculation unit 120 employ an algorithm that calculates a risk assessment score based on the location correlations score and other factors or information, such as device authenticity score and how frequent location signals are collected. Thus, the lower the risk score, the more likely it is that the user 102 is the actual person they purported to be, (e.g., the genuine customer for the account 110); while a higher risk score indicates a higher degree of uncertainty that the user 102 is the actual person they purported to be (e.g., the genuine customer), which uncertainty is caused in some part by the client device 104 connecting from an uncustomary or atypical location and/or time of day.

In various implementations, the authentication server 114 may transmit or provide authentication verification information to the application 108 on the client device 104. The contents of the authentication verification information depends on the risk score, and in some implementations may include the risk score. For example, if the risk calculation unit 120 produces a low risk score, then the authentication server 114 may provide authentication verification information indicating that the user 102 may have full unlimited use of and access to the account 110 via the application 108; or if the risk calculation unit 120 produces a high risk score, then the authentication server 114 may request additional authentication information from the user 102 via the application and/or may restrict the type of access to the account 110 that is granted to the user 102. An example of restricted access is allowing the user 102 to see the balance in a bank account, but not allowing the user 102 to withdraw or transfer funds from the account.

Figure 2:
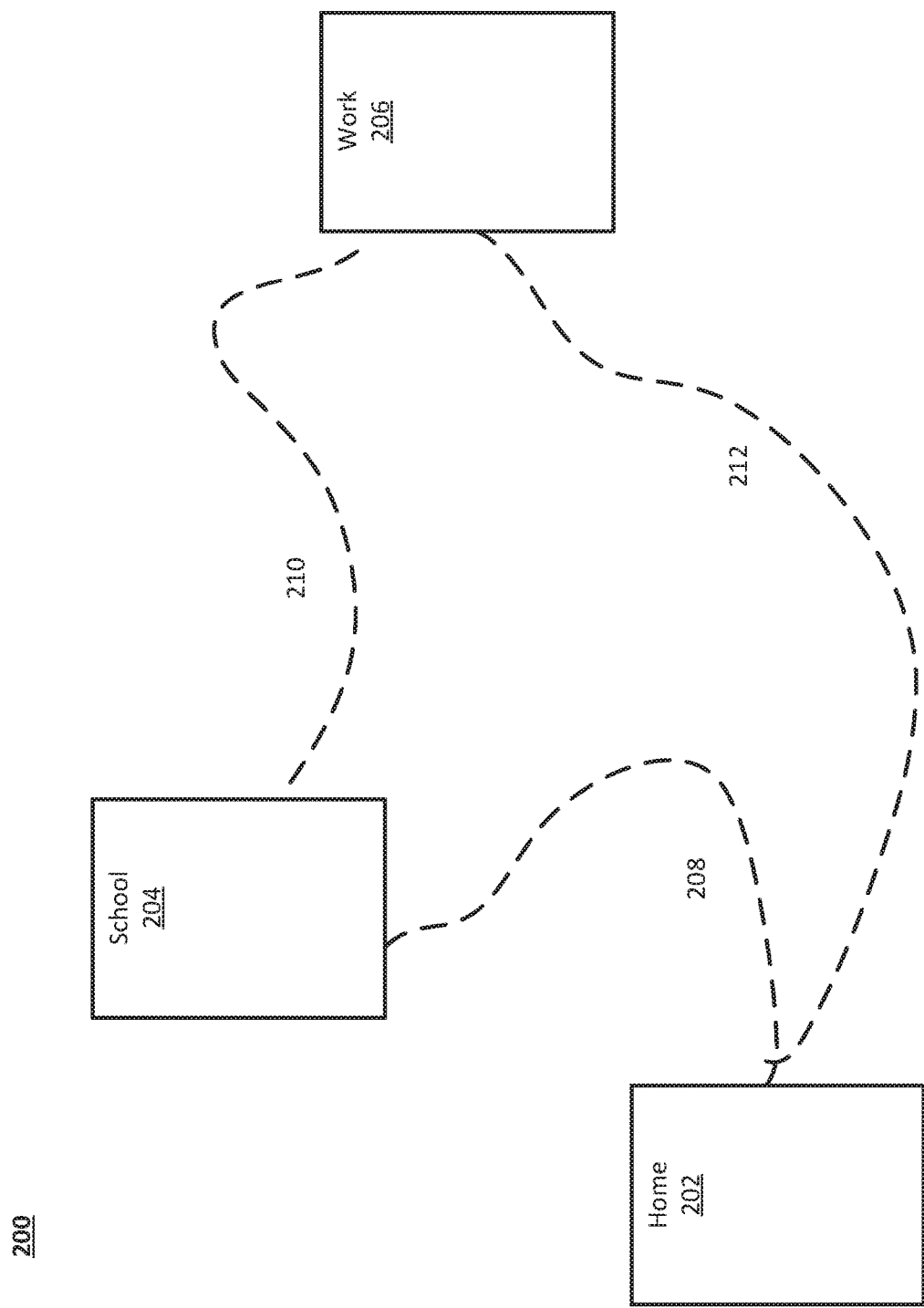
FIG. 2 is an example of travel paths and locations according to one or more implementations of the disclosure.

FIG. 2 illustrates examples 200 of travel paths and locations according to one or more implementations of the disclosure. In this example, on a typical work day, the user 102 may leave home 202 at a first time (e.g., 7:00) and travel to a school 204 along the path 208, arriving at the school 204 at time 2 (e.g., 7:30) to drop the children off. The user 102 may then proceed to their work building 206 along the path 210 arriving at time 3 (e.g., 8:00). The user 102 may then leave the work building 206 (e.g., at 18:00) and travel along the path 210 to arrive at the school 204 at time 4 (e.g., 18:30), pick up the kids and then travel the path 208 to arrive home at time 5 (e.g. 19:00). On another day when school is not in session, the user 102 may travel directly from home 202 at time 6 (e.g. 7:20) to work 206 along the path 212 and arrive at work 206 at time 7 (e.g., 8:00). At various points along paths 208, 210, and 212, and at static locations such as the home 202, the work building 206 and the school 204, the client device 104 may transmit or otherwise communicate location information, including a timestamp, to the authentication server 114, which builds a location history 124 for the client device 104. The location history 124 is a profile of such location or movement behavior of the user 102 that is stored in the database 122, and that is used by the authentication server 114 to authenticate the user 102. The more detailed (e.g., the more frequent and/or the more voluminous) the location information that is collected from the user 102, the better (e.g., the more accurate) the profile the authentication server 114 can build, and the more accurate the authentication assessment will be.

In various embodiments, the user 102, on the client device 104, may provide an authorization to the authentication server 114 to collect location information of the user 102. For example, the user 102 may open the application 108 on the client device 104 and log in to the account 110 associated with the user 102. The user 102 can then select an opt-in permission in the application 108 to give permission to or permit the authentication server 114 to obtain location information from the user 102 to be stored in the database 122. The application 108 can access location information produced or obtained by the location determining unit 106 of the client device 104 using one or more features in a software development kit (SDK) and obtain the location information via an application programming interface (API). The authentication server 114 obtains, over a communication network, e.g., network 112, the location information from the client device 104 and stores the location information in records of the location history 124 of the user 102, in the database 122. The records can include information related to the user 102, the client device 104, the account 110, and the location. Each record stores associated time information (e.g., time stamp) for each location entry. In various implementations, this collection of location information and building of the location history 124 is done prior to the authentication server 114 attempting to authenticate or verify the identity a user 102 based on the user's current location at the time of the authentication request.

The authentication server 114 can create a model 121 of the activity of the user 102 based on the location information and associated times that are obtained from the client device 104. As the authentication server 114 obtains more location information over time, the model 121 can be more refined and can be a better reflector and predictor of the movement or location activities of the user 102 when in possession of the client device 104. For example, the model 121 can represent the typical daily activities of a user 102 based on past location/time information that has been obtained and analyzed by the authentication server 114. Continuing the example with respect to FIG. 2, a model of the typical (e.g. 90% conforming) location activity during the work week for the user 102 may be represented as shown in Table 1.

TABLE 1

| Time Period: | 1900-0700 | 0701-0730 | 0731-0800 | 0801-1800 | 1801-1830 | 1831-1900 |
|---|---|---|---|---|---|---|
| Historical Location: | Home 202 | Path 208 or School 204 | Path 210 or Work 206 | Work 206 | Path 210 or School 204 | Path 208 |

The movement activity of the user 102 can occasionally vary in uncustomary or atypical ways for various reasons that do not fit into or conform to the model. For example, the user 102 may sometimes experience unusual traffic on the way 210 to work 206 that delays arrive to 8:30 am, the user 102 may go out for lunch or go shopping around midday every now and then, or the user 102 may sometimes leave work 206 earlier or later than normal. As the model is provided with additional location information over time, the model can become a better reflector and predictor of the location of the user 102 because the infrequent, uncustomary movements and locations are overshadowed and identifiable as atypical by being different from the large number of typical and routine movements and locations. For example, the model represented in Table 1 may be built based on the criteria that the user 102 (i.e., the client device 104) is at the listed Location (e.g., within a predefined radius of a specific geographical point or coordinate of that Location, such as within 200 meters or within 0.5 mile or the like) at least 95 times out of 100 during the listed Time Period. In other words the model may be built to be, for example, 95% accurate according to the data in the location history 124 of the user 102. In various implementations, other accuracies, such as 98%, 90%, 85%, 80%, 75%, or the like, may be used to model the typical movement activity profile. In various implementations, the model may be used as a factor in calculating a location score and/or a risk assessment score as part of a location-based authentication process. The location score is a measure of how confident the model determines that the location detected is where the actual identify of who owns the location history of the device is currently located.

FIG. 3 is a process flow diagram illustrating an example of a process 300 for authenticating via location monitoring, according to examples of present disclosure. The computer-implemented process 300 begins by obtaining at 302, for example by the authentication server 114, a current location and an associated time from a client device of the user over a communications network. In various implementations, the authentication server 114 may obtain the current location and time information when the client device 104 transmits it, unsolicited, to the authentication server 114, or the authentication server 114 may request the current location and time information from the client device 104, for example, in response to a notification from the application 108 that the user 102 is attempting to access or perform a predefined action with the account 110.

After obtaining the current location and its time (302), the computer-implemented method 300 continues by determining at 304, e.g., using a hardware processor of the authentication server 114, whether the current location and the associated time is at or near a historical location and a historical time associated with the user. Continuing with the example above, the current location information and associated time, (e.g., a global positioning system (GPS) coordinate) may be the location of work 206 at 9 am on Wednesday, and the authentication server 114 may compare this current information with historical location information for the user 102 that is stored in the database 122 to determine whether there is a correspondence or correlation between the current and past locations, which may be in association with the current time; e.g., how far the current location is from the user's typical historical location at that time of day.

The computer-implemented method 300 continues at 306 by calculating or determining, by the hardware processor, a location score based on a degree of correlation between the current location and its associated time and the historical location(s) and the historical time(s). For example, the server 114 can build a model 121 to determine an authentication result using raw data from the location receiving unit 116. The correlation score 118 being generated between the current location 116 and the location history 124, the risk score 120 is generated by determining how authentic the phone is and/or how frequent the location signals is generated.

Figure 4:
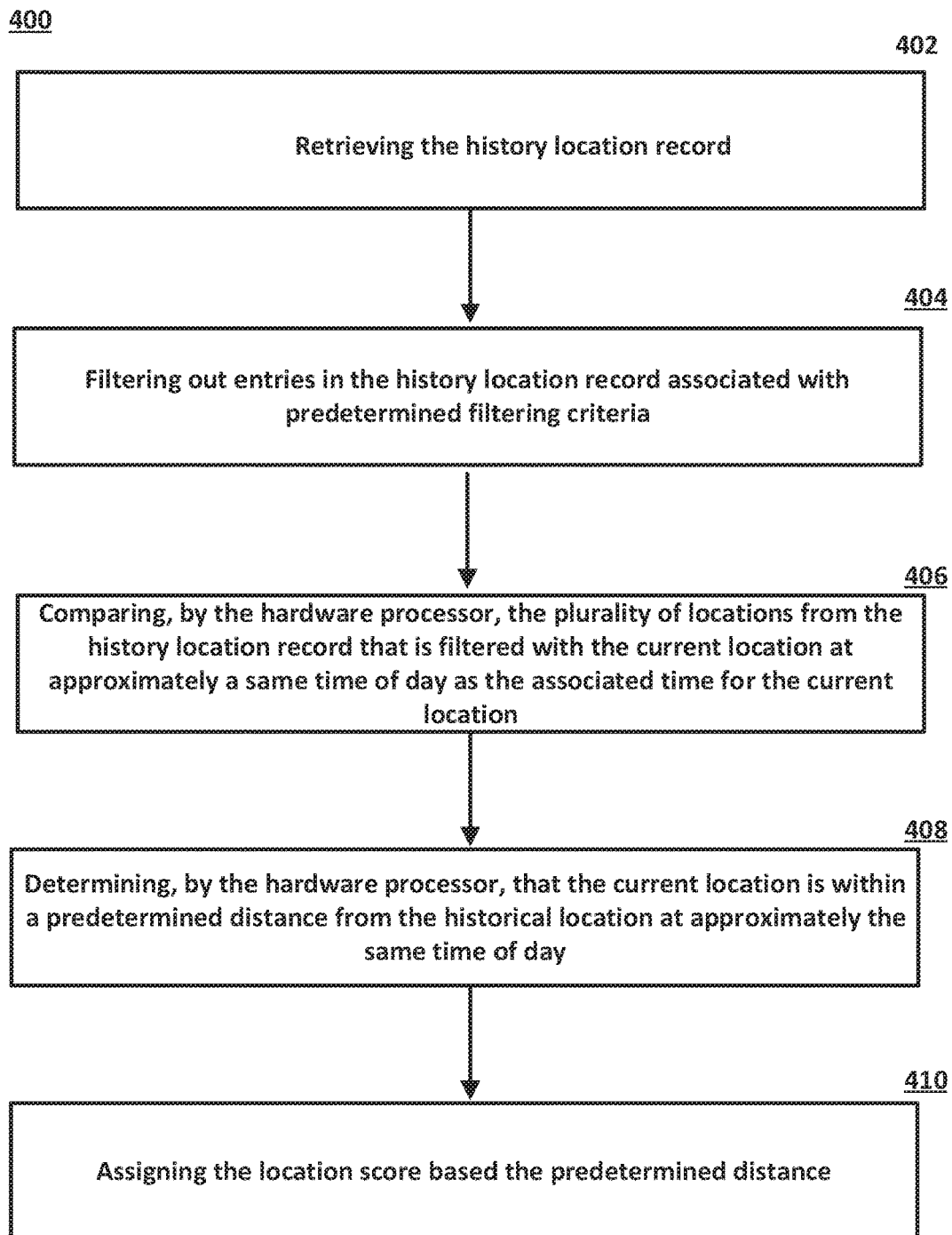
FIG. 4 is a process flow diagram illustrating an example of a process for determining the location score from the process of FIG. 3.

For instance, FIG. 4 shows an example of a method 400 for determining the location score. The method 400, begins by retrieving, by the authentication server 114, at 402, the location history 124 of the user 102 from the database 122. The method 400 continues by filtering out, by the authentication server 114, at 404, entries or records in the location history 124 that are associated with or meet predetermined filtering criteria. For example, if the predetermined filtering criteria includes holidays and weekends, then the authentication server 114 filters out records of locations that the user 102 occupied on holidays and weekends; i.e., the authentication server 114 processes or uses only records of locations that the user 102 occupied on non-holiday weekdays. The method 400 continues by comparing, by the authentication server 114, at 406, the plurality of filtered locations from the location history 124 with the current location (from 302); where the locations from the location history 124 were taken or recorded by the client device 104 at approximately the same time of day as the associated time for the current location, (e.g., within plus or minus 5 or 10 or 15 or 30 minutes of the associated time for the current location). In some implementations, there may be no filtering criteria or variable filtering criteria.

In various embodiments, the comparing at 406 (or the filtering at 404) can further include using a predetermined or specified time frame to select (or filter) the records in the location history 124 so as to perform the comparing only on records that have timestamps within the time frame. For example, the predetermined time frame can be a prior day, a prior week, a prior month, or a specified number of prior days, such as 90 days.

The method 400 continues by determining, by the authentication server 114, at 408, whether the current location is within a predetermined distance from the historical location(s), (e.g., from the locations in the filtered records from the location history 124 that are being used in the comparing at 406 or from the location from a model, such as the model of Table 1, in implementations that employ a model), at approximately the same time of day, (or during the same time period of the day for implementations using a model such as the model of Table 1). For example, the predetermined distance may be 50 yards, 100 yards, 0.1 mile, 0.2 mile, 0.5 mile, 1 mile, 2 miles, 5 miles, etc. from the historical location and approximately the same time of day may be within +/−5 minutes, within +/−10 minutes, within +/−20 minutes, within +/−30 minutes, etc.

The method 400 continues by assigning (e.g., from a lookup table) or calculating, by the authentication server, at 410, the location score based upon the predetermined distance or a set of predetermined distances. For example, in some implementations, the location score may have a range from 1 to 100, with a higher location score indicating that the user 102 is closer to the historic location at the approximately same time of day. Thus, the location score represents the degree of correlation between the current location and time and the historical location(s) at a similar time, and a higher location score indicates a higher degree of correlation; e.g., that the user 102 is in or near an expected location for a given time of day as compared to past patterns of movement behavior. In such implementations the score may be proportional to or otherwise a function of the predetermined distance; e.g., if the predetermined distance is 17 yards and the current location is within that predetermined distance, then the score may 100 out of 100; if the predetermined distance is 0.1 mile and the current location is within that predetermined distance, then the score may 90 out of 100; if the predetermined distance is 0.2 mile and the current location is within that predetermined distance, then the score may 80 out of 100; if the predetermined distance is 0.5 mile and the current location is within that predetermined distance, then the score may 50 out of 100, and the like. In various implementations, the function need not be linear.

Returning again to FIG. 3, the computer-implemented method 300 continues by calculating or determining at 308, by the hardware processor of the authentication server 114, a risk assessment score based on the location score. A higher location score would result in a lower risk assessment score.

The computer-implemented method 300 continues by providing at 310, over the communications network, an authentication verification for the user 102, which may include the risk assessment score. In some implementations, the authentication verification may specify whether or not the user 102 is permitted to perform one or more actions with a resource (e.g., an online resource), where the actions that are permitted are chosen based on the risk assessment score. For example, the actions can include: viewing a financial account, performing a transaction in the financial account, and communicating with an authorized person managing the financial account, etc. The availability of an action among the group of actions is dependent on the risk assessment score. A lower risk assessment score permits more actions with the online resource. For example, if the person has a low risk assessment score, which indicates that it is a less risky identity, more higher risk functionality can be enabled to the person, such as allowing the person an online transaction including, but are not limited to, a fund transfer and a bill payment. If the person has a high risk assessment score, the person may be granted the ability to perform another set of transactions, such as, but are not limited to, access to view balances and set up direct deposits. If the person would like more access, the person may be need to provide further identification verification by, for example, calling in to an account specialist or perform additional steps, such as entering a one-time password or using a government issued verification information.

Figure 5:
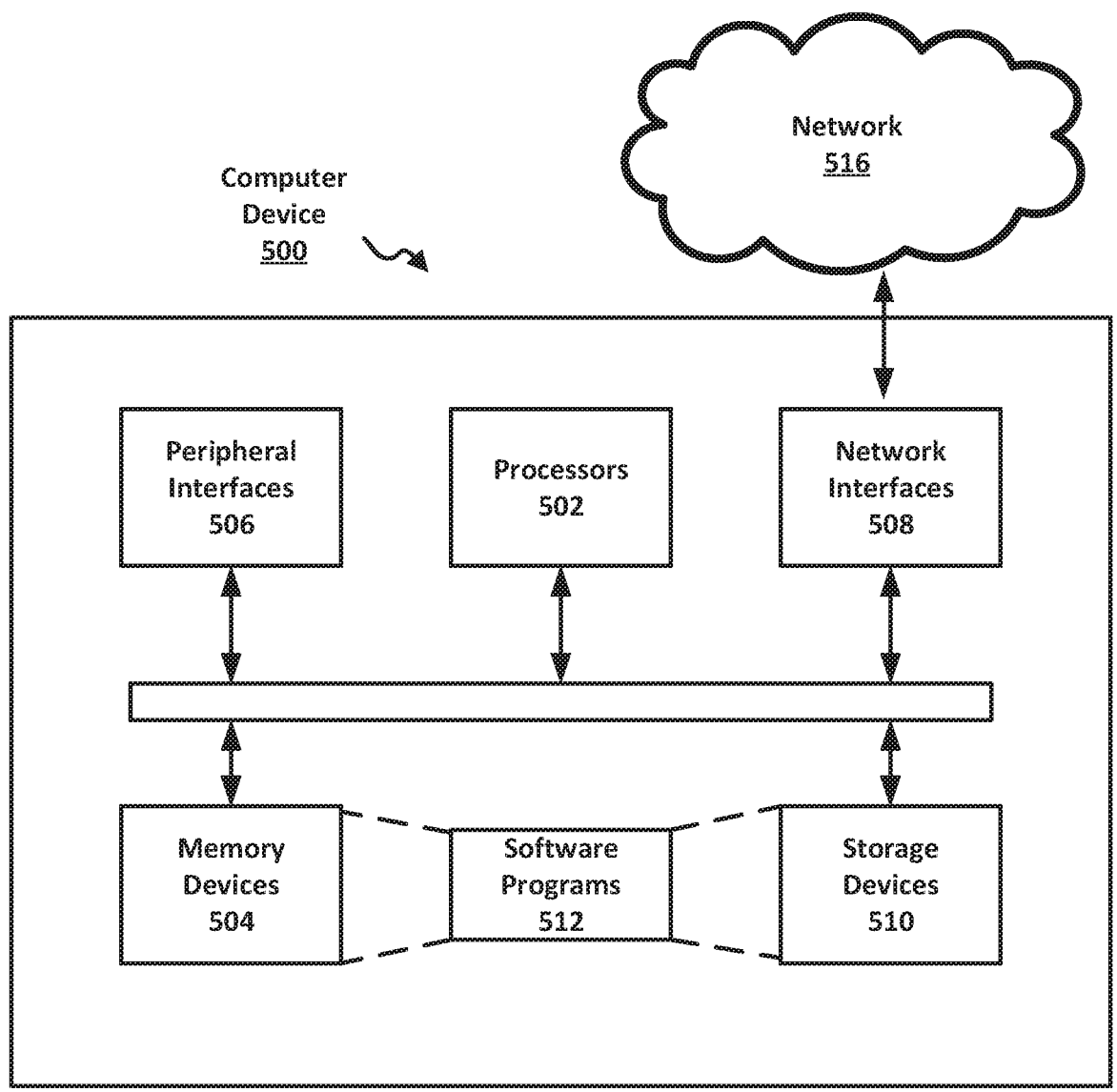
FIG. 5 is an example of a hardware configuration for a computer device, which can be used to implement the invention and perform one or more of the processes described above.

FIG. 5 is an example of a hardware configuration for a computer device 500, which can be used to perform one or more of the processes described above and/or to implement the server 114, database 122, and/or client device 104 described above. The computer device 500 can be any type of computer devices, such as desktops, laptops, servers, etc., or mobile devices, such as smart telephones, tablet computers, cellular telephones, personal digital assistants, etc. As illustrated in FIG. 5, the computer device 500 can include one or more processors 502 of varying core configurations and clock frequencies. The computer device 500 can also include one or more memory devices 504 that serve as a main memory during the operation of the computer device 500. For example, during operation, a copy of the software that supports the above-described operations can be stored in the one or more memory devices 504. The computer device 500 can also include one or more peripheral interfaces 506, such as keyboards, mice, touchpads, computer screens, touchscreens, etc., for enabling human interaction with and manipulation of the computer device 500.

The computer device 500 can also include one or more network interfaces 508 for communicating via one or more networks, such as Ethernet adapters, wireless transceivers, or serial network components, for communicating over wired or wireless media using protocols. The computer device 500 can also include one or more storage device 510 of varying physical dimensions and storage capacities, such as flash drives, hard drives, random access memory, etc., for storing data, such as images, files, and program instructions for execution by the one or more processors 502.

Additionally, the computer device 500 can include one or more software programs 512 that enable the functionality described above. The one or more software programs 512 can include instructions that cause the one or more processors 502 to perform the processes, functions, and operations described herein, for example, with respect to the processes of FIGS. 3 and 4. Copies of the one or more software programs 512 can be stored in the one or more memory devices 504 and/or on in the one or more storage devices 510. Likewise, the data utilized by one or more software programs 512 can be stored in the one or more memory devices 504 and/or on in the one or more storage devices 510.

In implementations, the computer device 500 can communicate with other devices via a network 516. The other devices can be any types of devices as described above. The network 516 can be any type of network, such as a local area network, a wide-area network, a virtual private network, the Internet, an intranet, an extranet, a public switched telephone network, an infrared network, a wireless network, and any combination thereof. The network 516 can support communications using any of a variety of commercially-available protocols, such as TCP/IP, UDP, OSI, FTP, UPnP, NFS, CIFS, AppleTalk, and the like. The network 516 can be, for example, a local area network, a wide-area network, a virtual private network, the Internet, an intranet, an extranet, a public switched telephone network, an infrared network, a wireless network, and any combination thereof.

The computer device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 500 as described above need not be enclosed within a single enclosure or even located in close proximity to one another. Those skilled in the art will appreciate that the above-described componentry are examples only, as the computer device 500 can include any type of hardware componentry, including any necessary accompanying firmware or software, for performing the disclosed implementations. The computer device 500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA), cryptographic co-processor, or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A computer-implemented method to authenticate a user, the computer-implemented method comprising:
   receiving, by at least one processor, a current location and an associated time from a client device of the user over a communications network;
   determining, by the at least one processor, a location score based on a correlation between the current location and the associated time and a historical location and a historical time that are associated with the client device of the user; and
   authenticating, over the communications network, one or more actions performed by the user with an online resource based on the location score.

2. The computer-implemented method of claim 1, further comprising:
   obtaining, by the at least one processor, a plurality of locations and an associated plurality of times from the client device over the communications network; and
   storing, by the at least one processor, the plurality of locations and the associated plurality of times in a history location record of a database that is associated with an account of the user of the client device.

3. The computer-implemented method of claim 2, wherein determining the location score based on the correlation comprises:
   accessing the history location record;
   filtering out entries in the history location record associated with predetermined filtering criteria;
   comparing, by the at least one processor, the plurality of locations from the history location record that is filtered with the current location at approximately a same time of day as the associated time for the current location;
   determining, by the at least one processor, that the current location is within a predetermined distance from the historical location at approximately the same time of day; and
   assigning the location score based the predetermined distance.

4. The computer-implemented method of claim 3, wherein the predetermined distance is less than or equal to one mile from the historical location.

5. The computer-implemented method of claim 3, wherein the comparing comprises selecting a predetermine time frame from the historic location record with which to perform the comparing.

6. The computer-implemented method of claim 5, wherein the predetermined time frame is a prior day, a prior week, or a prior month.

7. The computer-implemented method of claim 3, wherein the predetermined filtering criteria comprises holidays and weekends.

8. The computer-implemented method of claim 1, further comprising obtaining authorization from the user to collect location information of the user.

9. The computer-implemented method of claim 1, wherein an action of the one or more actions comprises one or more of: viewing a financial account, performing a transaction in the financial account, and communicating with an authorized person managing the financial account.

10. The computer-implemented method of claim 9, wherein availability of the action among the one or more actions with the online resource is dependent on the risk assessment score, wherein a lower risk assessment score permits more actions with the online resource.

11. An authentication system for authenticating a user, comprising: one or more hardware processors; and
   a memory coupled to the one or more hardware processors, the memory storing instructions, which when executed by the one or more hardware processors, cause the one or more hardware processors to perform operations comprising:
   determining a location score based on a correlation between a current location of the user and an associated time and a historical location and a historical time for the user; and
   authenticating, over a communications network, one or more actions performed by a user with an online resource based on the location score.

12. The authentication system of claim 11, wherein the operations further comprise:
   obtaining a plurality of locations and an associated plurality of times from a client device of the user over the communications network; and
   storing the plurality of locations and the associated plurality of times in a history location record of a database that is associated with an account of the user of the client device.

13. The authentication system of claim 12, wherein determining the location score based on the correlation comprises:
   accessing the history location record;
   filtering out entries in the history location record associated with predetermined filtering criteria;
   comparing the plurality of locations from the history location record that is filtered with the current location at approximately a same time of day as the associated time for the current location;
   determining that the current location is within a predetermined distance from the historical location at approximately the same time of day; and
   assigning the location score based the predetermined distance.

14. The authentication system claim 13, wherein the predetermined distance is less than or equal to one mile from the historical location.

15. The authentication system of claim 13, wherein the comparing comprises selecting a predetermine time frame from the historic location record with which to perform the comparing.

16. The authentication system of claim 11, further comprising obtaining authorization from the user to collect location information of the user.

17. A non-transitory computer-readable medium for performing an authentication method for authenticating a user, the non-transitory computer-readable medium comprising instructions, which when executed by one or more hardware processors, cause the one or more hardware processors to perform operations comprising:

obtaining a plurality of locations and an associated plurality of times from a client device of the user;

determining a location score based on a correlation between a current location of the user and an associated time and a historical location and a historical time based on the plurality of locations and associated plurality of time that are obtained for a user; and authenticating one or more actions performed by the user with an online resource based on the location score.

18. The non-transitory computer-readable medium of claim 17, further comprises:

storing the plurality of locations and the associated plurality of times in a history location record of a database that is associated with an account of the user of the client device.

19. The non-transitory computer-readable medium of claim 17, wherein an action of the one or more actions comprises one or more of: viewing a financial account, performing a transaction in the financial account, and communicating with an authorized person managing the financial account.

20. The non-transitory computer-readable medium of claim 19, wherein availability of the action among the one or more actions with the online resource is dependent on the risk assessment score, wherein a lower risk assessment score permits more actions with the online resource.

* * * * *